United States Patent
Garcia et al.

[19]

[11] Patent Number: 5,850,948
[45] Date of Patent: Dec. 22, 1998

[54] FINGER-OPERABLE PUMP WITH PISTON BIASING POST

[75] Inventors: Firmin Garcia, Evreux; Jean-Paul LeCoutre, Iton; Daniel Chavigny, Balines; Denis Croibier, Brezolles, all of France

[73] Assignee: Valois S.A., Verneuil-Sur-Avre-Cedex, France

[21] Appl. No.: 713,945

[22] Filed: Sep. 13, 1996

[51] Int. Cl.[6] .................................................. G01F 11/06
[52] U.S. Cl. ....................................... 222/321.9; 222/341
[58] Field of Search .............................. 222/321.2, 321.7, 222/321.9, 341

[56] References Cited

U.S. PATENT DOCUMENTS

| Re. 28,366 | 3/1975 | Pechstein | 239/333 |
|---|---|---|---|
| 1,362,077 | 12/1920 | Bobrick . | |
| 2,534,504 | 12/1950 | Engstrom | 222/383 |
| 2,657,834 | 11/1953 | Bacheller | 222/321 |
| 2,809,868 | 10/1957 | Thompson | 299/107.2 |
| 2,861,839 | 11/1958 | Mellon | 299/97 |
| 2,987,223 | 6/1961 | Armour | 222/207 |
| 3,088,636 | 5/1963 | Spatz | 222/213 |
| 3,124,080 | 3/1964 | Sisson | 103/178 |
| 3,129,854 | 4/1964 | Boehm et al. | 222/383 |
| 3,157,323 | 11/1964 | Kitterman | 222/520 |
| 3,159,316 | 12/1964 | O'Donnell et al. | 222/321 |
| 3,161,329 | 12/1964 | Fedit et al. | 222/321 |
| 3,170,633 | 2/1965 | Castelli | 239/327 |
| 3,185,352 | 5/1965 | Ghisolfi | 222/193 |
| 3,187,960 | 6/1965 | Gorman | 222/321 |

(List continued on next page.)

FOREIGN PATENT DOCUMENTS

| 0 014 754 A1 | 3/1980 | European Pat. Off. . |
|---|---|---|
| 0 289 854 A2 | 11/1988 | European Pat. Off. . |
| 0 289 855 A2 | 11/1988 | European Pat. Off. . |
| 0 289 855 A3 | 11/1988 | European Pat. Off. . |
| 0 289 856 A2 | 11/1988 | European Pat. Off. . |
| 89108879.1-2309 | 8/1990 | European Pat. Off. . |
| 71.13220 | 11/1972 | France . |
| 75.01005 | 5/1975 | France . |
| 75.11538 | 5/1978 | France . |
| 78.24482 | 3/1980 | France . |
| 84.00725 | 7/1985 | France . |
| 27 49 644 A1 | 11/1978 | Germany . |
| 27 32 888 A1 | 2/1979 | Germany . |
| 201989 | 1/1985 | Italy . |
| WO 93/13873 | 7/1993 | WIPO . |

OTHER PUBLICATIONS

French language drawing entitled Principe D'Amorcage et de Fonctionnement de la Pompe VP82 STD.
Brochure entitled "Valois Cosmetics".
Advertisement "Bakan Pistol–Grip Sprayer".
Brochure "Bakan Plastics Non–Aerosol Sprayers and Dispensers".
Seaquist Pump Systems "The Sea Spray System" advertisement (2 sheets).
Seaquist Pump System "The SeaMist System" advertisement (2 sheets).
Seaquist Pump Systems "The EuroMist System" advertisement (2 sheets).

*Primary Examiner*—Joseph A. Kaufman
*Attorney, Agent, or Firm*—Rockey, Milnamow & Katz, Ltd.

[57] ABSTRACT

A finger-operable pump includes a pump body, a non-return valve, and an actuating plunger. A plunger return spring biases the plunger toward an elevated, rest position. A piston is carried by the plunger and is movable relative to the plunger between a closed position sealing a discharge passage in the plunger and an open position in which fluid can flow from the pump through the plunger discharge passage and out of the pump. A piston return spring is provided between the piston and the plunger for biasing the piston toward the closed position, and the piston return spring includes a post which is resiliently bendable.

11 Claims, 5 Drawing Sheets

U.S. PATENT DOCUMENTS

| | | | |
|---|---|---|---|
| 3,211,346 | 10/1965 | Meshberg | 222/263 |
| 3,223,292 | 12/1965 | Keeney et al. | 222/321 |
| 3,228,570 | 1/1966 | Steiman | 222/321 |
| 3,228,571 | 1/1966 | O'Donnell et al. | 222/321 |
| 3,229,864 | 1/1966 | Roder | 222/321 |
| 3,237,571 | 3/1966 | Corsette | 222/321 |
| 3,239,151 | 3/1966 | Jokelson | 239/333 |
| 3,248,022 | 4/1966 | Schulman et al. | 222/321 |
| 3,257,961 | 6/1966 | Schlenker | 103/178 |
| 3,331,559 | 7/1967 | Fedit | 239/333 |
| 3,361,305 | 1/1968 | Spatz | 222/207 |
| 3,399,836 | 9/1968 | Pechstein | 239/333 |
| 3,414,169 | 12/1968 | Corsette | 222/321 |
| 3,458,090 | 7/1969 | Sloggin, Jr. | 222/309 |
| 3,463,093 | 8/1969 | Pfeiffer et al. | 103/188 |
| 3,583,605 | 6/1971 | Corsette | 222/321 |
| 3,608,788 | 9/1971 | Tasaka | 222/384 |
| 3,627,206 | 12/1971 | Boris | 239/321 |
| 3,680,790 | 8/1972 | Boris | 239/353 |
| 3,746,260 | 7/1973 | Boris | 239/321 |
| 3,756,474 | 9/1973 | Riccio | 222/193 |
| 3,759,426 | 9/1973 | Kane et al. | 222/385 |
| 3,761,022 | 9/1973 | Kondo | 239/333 |
| 3,774,849 | 11/1973 | Boris | 239/338 |
| 3,786,963 | 1/1974 | Metzler, III | 222/136 |
| 3,796,375 | 3/1974 | Boris | 239/333 |
| 3,799,448 | 3/1974 | Nozawa et al. | 239/321 |
| 3,827,606 | 8/1974 | Knickerbocker | 222/384 |
| 3,877,616 | 4/1975 | Stevens | 222/321 |
| 3,908,870 | 9/1975 | Nozawa et al. | 222/321 |
| 3,923,250 | 12/1975 | Boris | 239/321 |
| 3,940,028 | 2/1976 | Beard | 222/321 |
| 3,949,906 | 4/1976 | Pettersen et al. | 222/153 |
| 3,949,910 | 4/1976 | Focht | 222/321 |
| 3,990,611 | 11/1976 | Sojka | 222/135 |
| 3,991,914 | 11/1976 | Kotuby et al. | 222/321 |
| 4,022,354 | 5/1977 | Kotuby | 222/321 |
| 4,025,046 | 5/1977 | Boris | 239/333 |
| 4,050,613 | 9/1977 | Corsette | 222/321 |
| 4,050,860 | 9/1977 | Beres | 417/444 |
| 4,051,983 | 10/1977 | Anderson | 222/321 |
| 4,056,216 | 11/1977 | Kotuby | 222/385 |
| 4,061,247 | 12/1977 | Meshberg | 222/1 |
| 4,081,111 | 3/1978 | Sandow | 222/309 |
| 4,089,442 | 5/1978 | Hafele et al. | 222/321 |
| 4,113,145 | 9/1978 | Meshberg | 222/1 |
| 4,144,987 | 3/1979 | Kishi | 222/321 |
| 4,147,476 | 4/1979 | Warren | 417/328 |
| 4,154,374 | 5/1979 | Kirk, Jr. | 222/321 |
| 4,169,546 | 10/1979 | Yuhas et al. | 222/341 |
| 4,189,064 | 2/1980 | O'Neill et al. | 222/321 |
| 4,230,242 | 10/1980 | Meshberg | 222/321 |
| 4,274,560 | 6/1981 | Cater | 222/321 |
| 4,323,175 | 4/1982 | Eckert | 222/256 |
| 4,369,899 | 1/1983 | Magers et al. | 222/153 |
| 4,402,432 | 9/1983 | Corsette | 222/321 |
| 4,410,107 | 10/1983 | Corsette | 222/321 |
| 4,433,799 | 2/1984 | Corsette | 222/309 |
| 4,454,964 | 6/1984 | Sacher | 222/43 |
| 4,458,832 | 7/1984 | Corsette | 222/153 |
| 4,485,943 | 12/1984 | Czech | 222/256 |
| 4,503,996 | 3/1985 | Sorm et al. | 222/321 |
| 4,533,069 | 8/1985 | Drobish | 222/209 |
| 4,603,794 | 8/1986 | DeFord et al. | 222/207 |
| 4,606,479 | 8/1986 | Van Brocklin | 222/321 |
| 4,615,465 | 10/1986 | Grothoff | 222/1 |
| 4,657,161 | 4/1987 | Endo et al. | 222/256 |
| 4,735,347 | 4/1988 | Schultz et al. | 222/321 |
| 4,821,928 | 4/1989 | Su | 222/321 |
| 4,830,284 | 5/1989 | Maerte | 239/333 |
| 4,838,459 | 6/1989 | Nitta | 222/136 |
| 4,871,092 | 10/1989 | Maerte | 222/153 |
| 4,899,913 | 2/1990 | Ruscitti et al. | 222/385 |
| 4,911,314 | 3/1990 | Schneider | 215/228 |
| 4,915,266 | 4/1990 | Knickerbocker | 222/402.16 |
| 4,941,595 | 7/1990 | Montaner et al. | 222/321 |
| 4,944,432 | 7/1990 | Jouillat | 222/321.2 |
| 4,960,230 | 10/1990 | Marelli | 222/321.9 |
| 4,971,226 | 11/1990 | Donoghue | 222/207 |
| 4,983,061 | 1/1991 | Demarest | 401/148 |
| 4,986,453 | 1/1991 | Lina et al. | 222/321 |
| 5,002,207 | 3/1991 | Giuffredi | 222/340 |
| 5,011,046 | 4/1991 | Graf et al. | 222/321 |
| 5,020,696 | 6/1991 | Cater | 222/321 |
| 5,025,958 | 6/1991 | Montaner | 222/321 |
| 5,026,193 | 6/1991 | Lucas | 401/219 |
| 5,031,800 | 7/1991 | Brunet | 222/153 |
| 5,038,965 | 8/1991 | Cater | 222/255 |
| 5,046,644 | 9/1991 | Cater | 222/321 |
| 5,046,645 | 9/1991 | Hagan et al. | 222/394 |
| 5,064,105 | 11/1991 | Montaner | 222/321 |
| 5,105,993 | 4/1992 | Le Haye et al. | 222/189 |
| 5,147,073 | 9/1992 | Cater | 222/341 |
| 5,238,156 | 8/1993 | Andris | 222/207 |
| 5,267,673 | 12/1993 | Crosnier et al. | 222/321.7 |
| 5,271,532 | 12/1993 | Jumel et al. | 222/321 |
| 5,337,926 | 8/1994 | Drobish et al. | 222/309 |
| 5,377,881 | 1/1995 | Jouillat | 222/321 |
| 5,411,181 | 5/1995 | Knickerbocker | 222/309 |

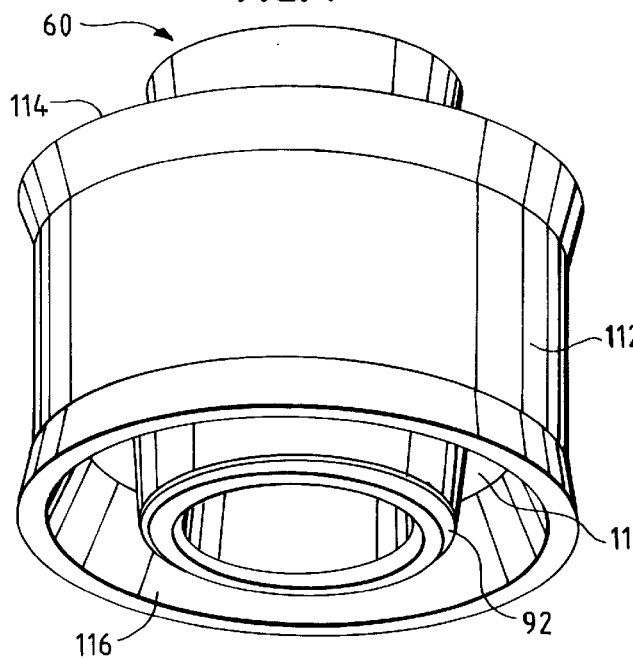
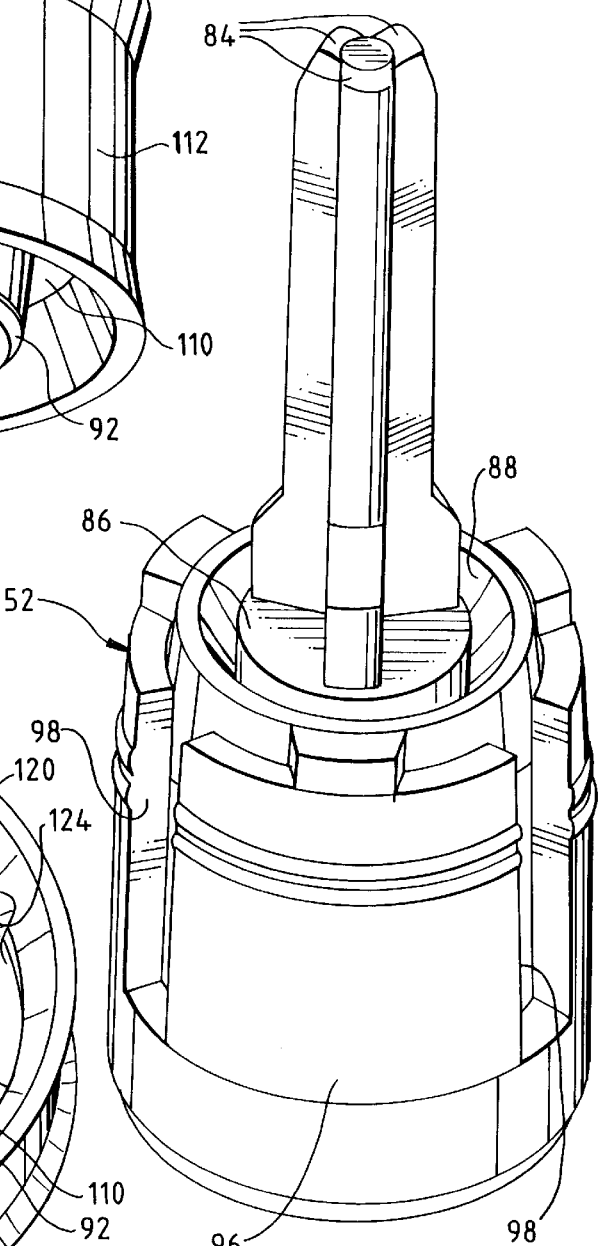
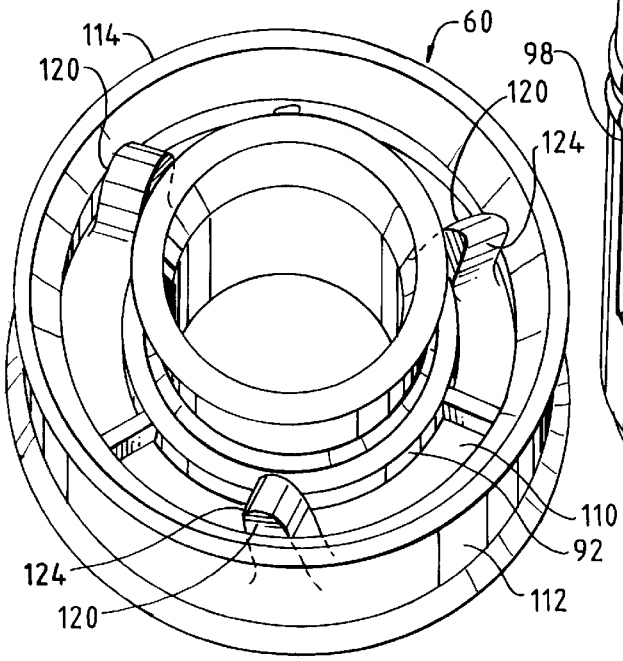

FINGER-OPERABLE PUMP WITH PISTON BIASING POST

TECHNICAL FIELD

This invention relates to a finger-operable pump which can be mounted in the top of a container and operated to dispense the container contents.

BACKGROUND OF THE INVENTION AND TECHNICAL PROBLEMS POSED BY THE PRIOR ART

Finger-operable dispensing pumps are typically adapted to be mounted on hand-held containers. Such containers are commonly used for liquid or paste products, such as cosmetic lotions and sprays, household and automotive cleaners, industrial preparations, and personal care products such as hairsprays, deodorants, colognes, and the like. Typically, some pumps operate to produce a fine mist or atomized spray, and other pumps operate to dispense a quantity of product in a liquid or paste form.

In one conventional design, the finger-operable pump employs a pump chamber in which is disposed a pressurizing piston carried on an actuating plunger. An actuator button is mounted on the upper end of the plunger above the pump body. The plunger has a discharge passage establishing communication between the pump chamber and the actuator button. The button has a dispensing orifice from which the product is discharged. The inlet opening of the discharge passage is normally closed by the piston. The pump can be actuated by pressing down on the actuator button so that relative movement between the plunger and piston occurs as a result of an increasing pressure in the pump chamber, and the relative movement opens the discharge passage. A spring acts against the actuator plunger to return the actuator plunger and piston upwardly to the elevated rest position when the finger pressure is released.

Some known designs also include a spring between the upper part of the plunger and the piston for normally applying a force to maintain the plunger and piston in a relative position in which the discharge passage is closed. Such a force is overcome when the chamber pressure increases sufficiently. While such designs may function generally satisfactorily, there is a need for an improved system for biasing the piston and plunger to a closed condition.

In particular, it would be advantageous to provide an improved system for biasing the piston to seal tight against a lower part of the plunger to normally occlude the discharge passage.

It would also be beneficial if such an improved system could accommodate the molding of the piston, plunger, and biasing system components from a thermoplastic material.

Further, such an improved system should include design features that can be readily incorporated in the system components so as to facilitate economical manufacture, high production quality, and consistent operating parameters unit-to-unit with high reliability.

The present invention provides an improved system which can accommodate designs having the above-discussed benefits and features.

SUMMARY OF THE INVENTION

The present invention provides a improved finger-operable pump. The pump includes a pump body defining a chamber and having an inlet opening and an outlet opening. A non-return valve is located at the inlet opening. An actuating plunger projects from the chamber through the outlet opening for reciprocatable movement between an elevated, unactuated, rest position, and a lowered, fully actuated position. The plunger has upper and lower plunger portions together defining a discharge passage establishing communication between ambient atmosphere and the chamber. The plunger lower portion defines a valve seat at the discharge passage.

A plunger return spring acts between the pump body and the plunger lower portion for biasing the plunger relative to the pump body toward the elevated, rest position.

A piston is carried on the plunger in the pump chamber. The piston is in sliding and sealing engagement with the pump body for accommodating movement relative to the plunger between (a) a closed position sealed against the plunger lower portion valve seat to occlude the discharge passage, and (b) an open position spaced from the valve seat.

A piston return spring acts between the piston plunger upper portion for biasing the piston toward the closed position. The piston return spring includes a post which is resiliently bendable.

Preferably, the piston return spring is molded from a thermoplastic material in the form of a post as a unitary extension of the piston. The post preferably has a laterally offset distal end which is resiliently bendable toward the piston to accommodate separation of the piston from the plunger lower portion valve seat.

BRIEF DESCRIPTION OF THE DRAWINGS

In the accompanying drawings forming part of the specification, in which like numerals are employed to designate like parts throughout the same, FIG. 1 shows the pump with the components in an elevated, unactuated, rest position;

FIG. 9 is an enlarged, bottom, perspective view of the piston;

FIG. 10 is an enlarged, top, perspective view of the piston; and

FIG. 11 is a top, perspective view of the lower stem portion of the actuating plunger.

DESCRIPTION OF THE PREFERRED EMBODIMENT

While this invention is susceptible of embodiment in many different forms, this specification and the accompanying drawings disclose only some specific forms as an examples of the invention. The invention is not intended to be limited to the embodiments so described, however. The scope of the invention is pointed out in the appended claims.

For ease of description, the improved pump of this invention is described in the normal (upright) operating position, and terms such as upper, lower, horizontal, etc., are used with reference to this position. It will be understood, however, that the pump of this invention may be manufactured, stored, transported, used, and sold in an orientation other than the position described.

Figures illustrating the pump show some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

The pump of this invention is used with certain conventional components such as containers and dip tubes, the details of which, although not fully illustrated or described, will be apparent to those having skill in the art and an understanding of the necessary functions of such components.

Figure 1:
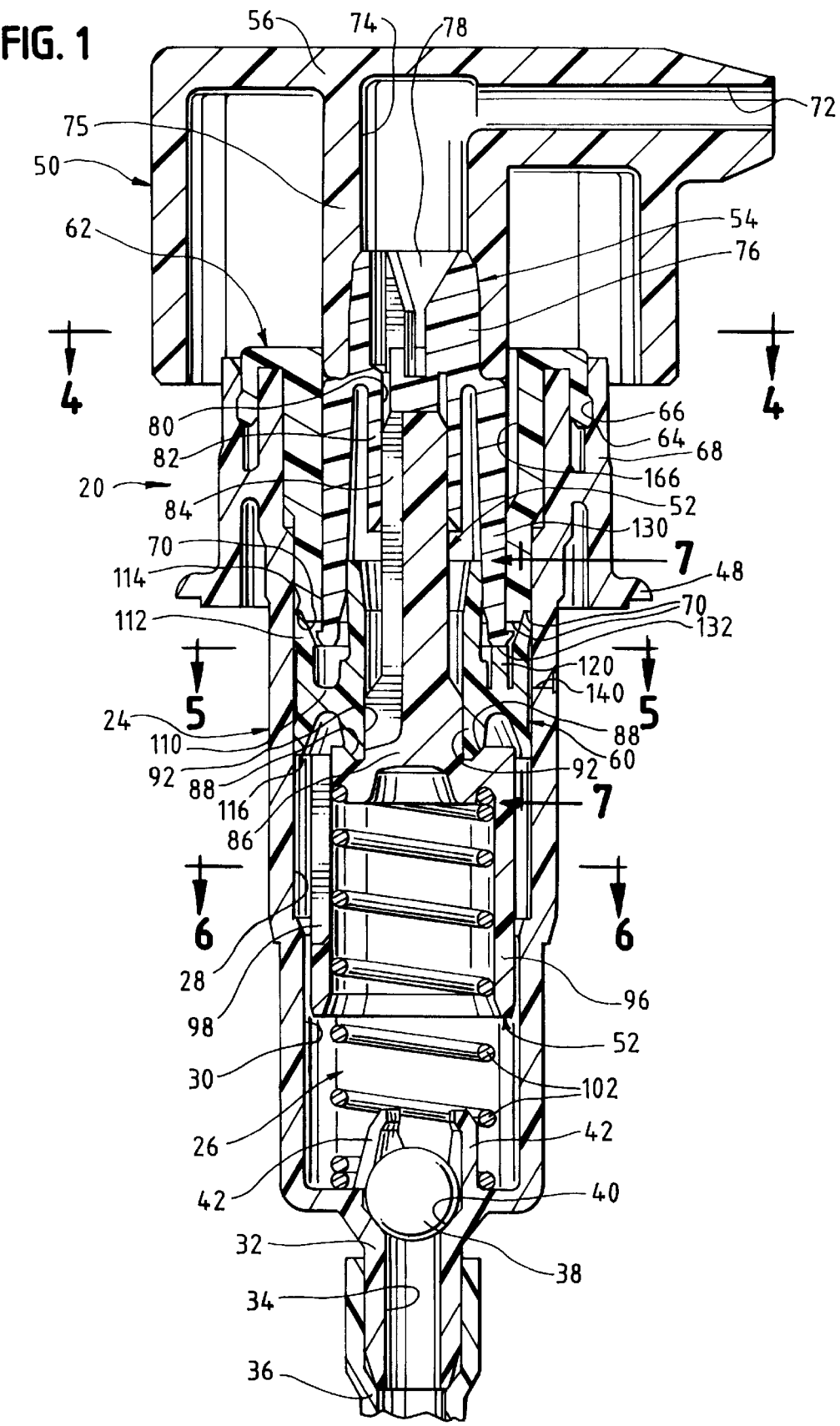
FIG. 1 is an elevational, cross-sectional view of the finger-operable pump of the present invention shown connected with a fragmentary portion of a suction tube.

With reference to FIG. 1, the pump of the present invention is designated generally by the reference numeral 20. The pump 20 is adapted to be mounted with a conventional or special connector (not illustrated) to a conventional or special container (not illustrated) which contains a liquid product (and this may include high viscosity products such as lotions or creams). The connector may include suitable means, such as a snap-on configuration, a thread configuration, or a crimp ferrule configuration for attaching the connector, along with the pump 20 mounted therein, to the open top of the container. For example, U.S. Pat. No. 4,986,453 discloses a threaded connector or cap 22 for attaching a pump to a threaded container. Such connectors are well known in the art, and the detailed design and operation of such connectors form no part of the present invention.

The pump 20 includes a main body 24 defining an internal dosage chamber or pump chamber 26 (FIG. 1). The pump chamber 26 includes an upper cylindrical portion 28 and a somewhat smaller diameter, lower, cylindrical portion 30 extending from the lower end of the upper cylindrical portion 28. The lower end of the pump body 24 includes a downwardly extending tubular portion 32 defining an inlet opening 34 at the bottom of the lower cylindrical portion 30 of the pump chamber 26. The tubular portion 32 is adapted to be received in an open, upper end of a suction tube or dip tube 36. The dip tube 36 is secured to the tubular portion 32 by means of a friction fit or crimp-on connection. The dip tube 36 extends to near the bottom of the container (not illustrated) in a conventional manner, and most of the length of the dip tube is thus normally submerged in the liquid within the container when the container is full and in a generally upright orientation.

Figure 3:
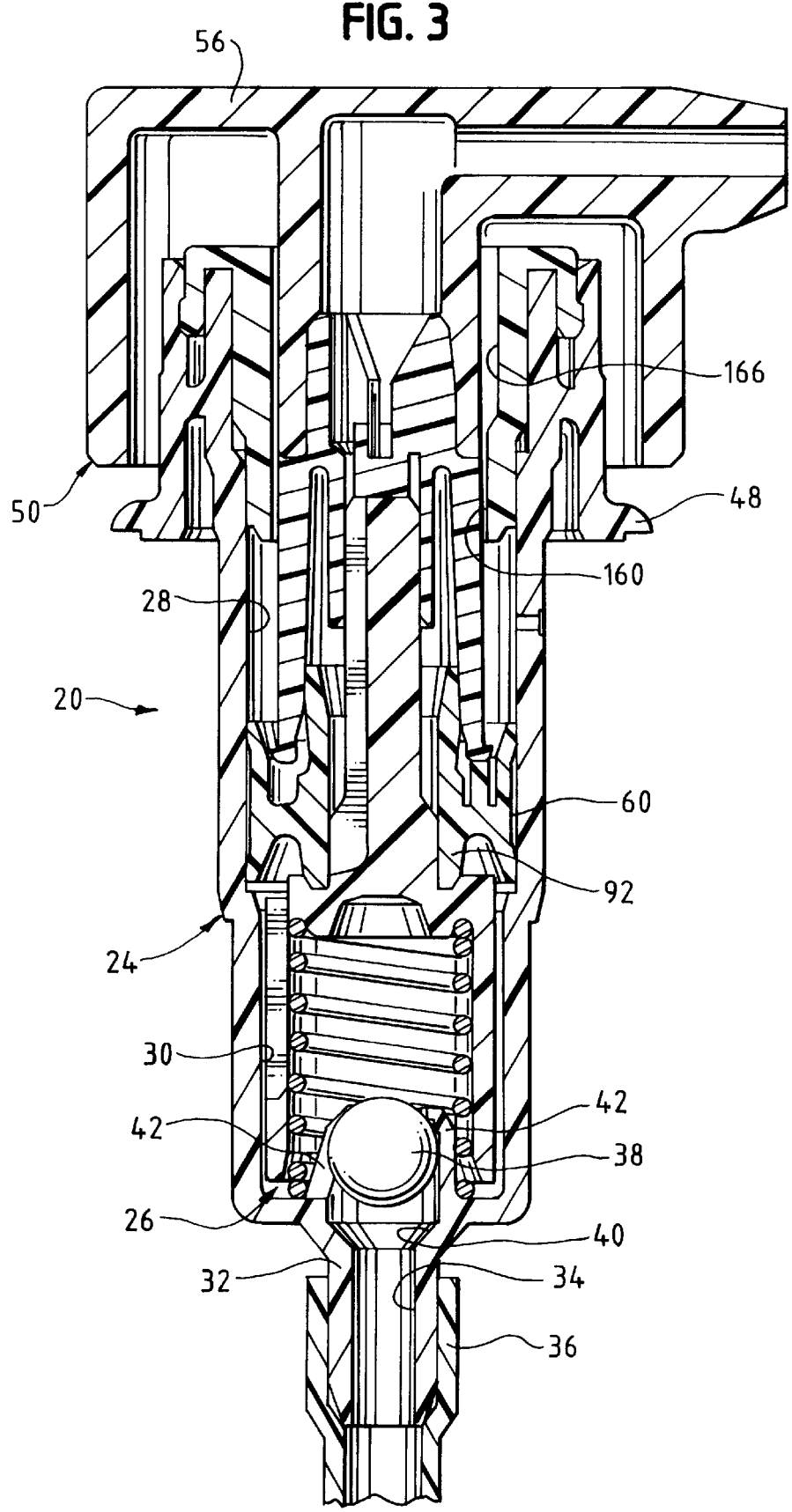
FIG. 3 is a view similar to FIG. 2, but FIG. 3 shows the position of the pump components shortly after the finger-actuating force has been released.
Figure 6:
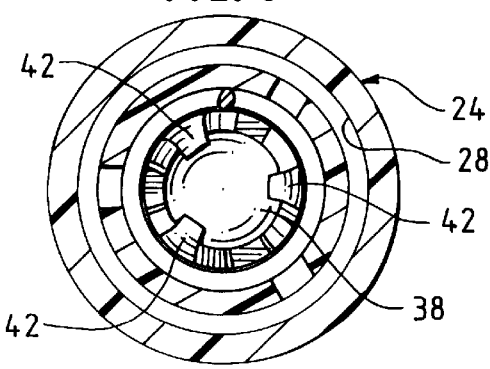
FIG. 6 is a cross-sectional view taken generally along the plane 6—6 in FIG. 1.

A check valve ball 38 is located at the pump inlet 34. The check valve ball 38 normally seats on a frustoconical surface 40 defined by the pump body 24 around the upper end of the inlet opening 34. As shown in FIGS. 1 and 6, the bottom interior end of the pump body 24 includes three, upwardly projecting, retention arms 42. Each retention arm 42 has an upper distal end which is angled inwardly over the check valve ball 38 to limit the upward movement of the ball 38 to the position illustrated in FIG. 3 during the return, suction stroke or refill stroke of the pump as described in detail hereinafter. When the check valve ball 38 is in the elevated position as shown in FIG. 3, the inlet opening 34 is open to allow the liquid from the container to enter the pump chamber 26 through the dip tube 36. When the ball 38 is in the lowered position, as shown in FIG. 1, the inlet opening 34 is occluded because the ball 38 seals against the frustoconical seating surface 40. As explained in detail hereinafter, the ball 38 is held against the frustoconical seating surface 40 when pressure increases in the pump chamber 26 during the downstroke or pressurizing stroke of the pump 20.

The upper end of the pump body 24 includes a radially outwardly extending flange 48 which is adapted to compress a gasket (not illustrated) on the top surface of the container around the container opening. The upper surface of the pump body flange 48 is engaged by the above-discussed connector (not illustrated) which forces the flange and hence, the pump body 24, downwardly and tight against the container.

The pump 20 includes a multi-component actuating plunger 50 which includes a lower stem or lower portion 52, an upper stem or upper portion 54, and an actuator button 56. The lower stem 52 and upper stem 54 are fixed together and do not move relative to each other. The actuator button 56 is secured to the top of the upper stem 54 for movement together with the upper stem 54 and lower stem 52. The button 56, upper stem 54, and lower stem 52 are described in more detail hereinafter.

A piston 60 is carried by the plunger 50 in the upper portion 28 of the pump chamber 26. The piston 60 is carried in sliding and sealing engagement with the pump body 24. The structure of the piston 60 is described in more detail hereinafter.

A collar 62 is disposed at the upper end of the pump body 24 and functions to prevent the pump components from sliding upwardly out of the pump body 24. To this end, the collar 62 includes an outer bead 64 which is received in a snap-fit engagement in an annular groove 66 defined in an upper annular flange 68 of the pump body 24. The collar 62 has a lower tubular end 70 which is received within the upper cylindrical portion 28 of the pump chamber to establish the fully elevated, rest position of the piston 60. So long as the collar 62 is in place, the internal pump components cannot be pulled outwardly from the pump body 24.

The actuator button 56 defines a horizontal discharge passage 72 which extends between the exterior of the button 56 and an interior, vertical dispensing cavity 74. The actuator button 56 has an inner, annular tube 75 which defines the cavity 74. The button tube 75 is press-fit onto an upper end portion 76 of the plunger upper portion or stem 54. The upper end portion 76 defines an internal cavity 78 communicating with the actuating button vertical cavity 74. The cavity 78 communicates with a reduced diameter cavity 80 defined within a cylindrical collar 82 defined by the upper stem 54. The collar 82 receives the upper end of the lower stem 52 in a press-fit engagement.

As illustrated in FIGS. 1 and 9, the lower stem 52 has an elongate, upper end portion defined by three intersecting walls 84. Each pair of adjacent walls 84 defines a vertical passage extending downwardly from the upper stem 54 and through the interior of the piston 60 to a lower cross wall 86. The lower cross wall 86 has an annular groove defining a valve seat or sealing surface 88.

The piston 60 includes an annular, inner wall or valve member 92 having a bottom edge which is adapted to sealingly engage the valve seat 88 around the circumference of the lower stem annular groove when the pump components are in the elevated, rest position as illustrated in FIG. 1. This prevents flow of liquid from the pump chamber 26 into the passages along the lower stem walls 84, through the upper stem 54, and into the actuating button 56.

The bottom end of the lower stem 52 includes a generally annular wall 96 which defines a plurality of circumferentially spaced, vertical slots 98. The annular wall 96 receives the upper end of a helical coil compression spring which functions as a plunger return spring 102. The top end of the spring 102 engages the bottom of the lower stem cross wall 86. The bottom end of the spring 102 engages the bottom end of the pump body 24 around the check valve ball retainer arms 42. The spring 102 functions to normally bias the lower stem 52 upwardly to the unactuated, elevated, rest position illustrated in FIG. 1. The lower stem 52, the upper stem 54 which is fixed to the lower stem 52, and the actuator button 56 which is fixed to the upper stem 54, all together define the actuating plunger 50 which is biased upwardly by the spring 102 to the elevated, rest position illustrated in FIG. 1.

The piston 60 is carried on the plunger 50 adjacent portions of the lower stem 52 and upper stem 54. The piston 60 has a cooperating configuration which accommodates movement of the piston 60 relative to the upper and lower stems under certain conditions. In particular, as illustrated in FIGS. 1, 9, and 10, the piston 60 includes an annular cross wall 110 extending radially outwardly from the annular inner wall or valve member 92. The cross wall 110 terminates in a generally annular outer wall or outer ring 112. As shown in FIGS. 1 and 9, the outer wall ring 112 has an upper piston lip 114 and a lower piston lip 116. The upper piston lip 114 and the lower piston lip 116 slidingly and sealingly engage the interior surface of the pump body chamber upper cylindrical portion 28.

With reference to FIG. 10, the piston 60 includes a piston return spring which, in the preferred embodiment, includes three posts 120. In alternate embodiments (not illustrated), a lesser or greater number of posts 120 may be employed. In the preferred embodiment, each post 120 is molded from a thermoplastic material as a unitary extension of the piston cross wall 110 between the annular inner valve member wall 92 and the annular outer ring 112. Any suitably resilient thermoplastic material, or other material, may be employed.

Figure 7:
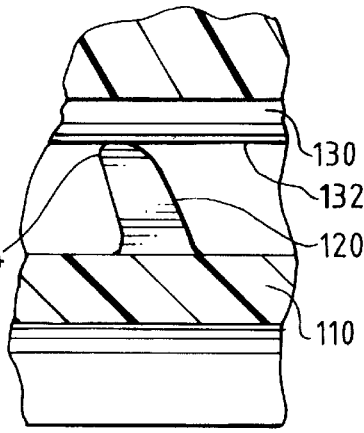
FIG. 7 is a fragmentary, elevational, cross-sectional view taken generally along the plane 7—7 in FIG. 1.
Figure 5:
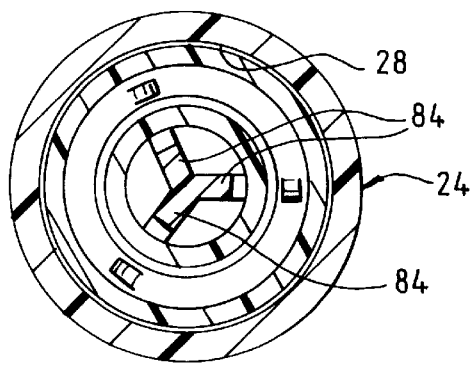
FIG. 5 is a cross-sectional view taken generally along the plane 5—5 in FIG. 1.

As best viewed in FIG. 7, each post 120 has a laterally offset distal end 124 which is resiliently bendable toward the cross wall 110 of the piston 60. The upper stem portion 54 includes a generally cylindrical annular wall 130 (FIG. 1) having a downwardly facing, annular, bearing surface 132 for being engaged by the upper, distal ends 124 of the posts 120.

When the pump 20 is in the unactuated, elevated, rest position illustrated in FIGS. 1 and 7, the posts 120 are in a condition of minimum stress, and each post projects above the cross wall 110 to its maximum height. In the elevated, rest position of the pump, the bottom of the piston annular inner wall or valve member 92 sealingly engages the lower stem valve seat 88 while the upper end of each post 120 engages the bottom surface 132 of the upper stem 54. The top edge of the piston upper lip 114 engages the bottom surface of the tubular end 70 of the fixed collar 62.

If a suitable conventional or special mechanical break-up unit (not illustrated) is mounted in the actuator button discharge passage 72, then the container liquid can be dispensed as an atomized spray. The pump 20 can be actuated or operated to dispense liquid product from the container by pressing down on the actuator button 56. The downward pressing force is transmitted from the button 56 to the upper stem 54. The pressing force acts through the upper stem 54 on the connected lower stem 52. The force on the lower stem 52 acts on the plunger return spring 102 so as to begin compressing the spring 102. The piston 60 is carried with the plunger 50 (comprising the button 56, upper stem 54, and lower stem 52), and the piston 60 is urged downwardly by the engagement of the piston post 120 with the bottom surface 132 of the upper stem annular wall 130. The bottom of the piston annular inner wall or valve member 92 initially remains seated and sealed against the lower stem valve seat 88. There is also some frictional engagement between the piston 60 on the one hand and the upper and lower stems 54 and 52, respectively, on the other hand. Such frictional engagement also functions to initially resist movement of the piston 60 relative to the stems 52 and 54.

As the actuator button 56 is pushed downwardly, fluid in the chamber is pressurized. If the pump 20 has not been previously operated, then there would be only air in the pump chamber 26, and that air is compressed. If the pump has been previously operated a number of times, then the pump will have been primed so that the pump chamber 26 will have been filled with liquid from the container. In any event, as the fluid in the pump chamber 26 is pressurized, the check valve ball 38 is forced tightly against the seat 40 at the bottom of the pump chamber to prevent the fluid from being forced out of the bottom of the pump chamber 26 and down the dip tube 36.

Figure 2:
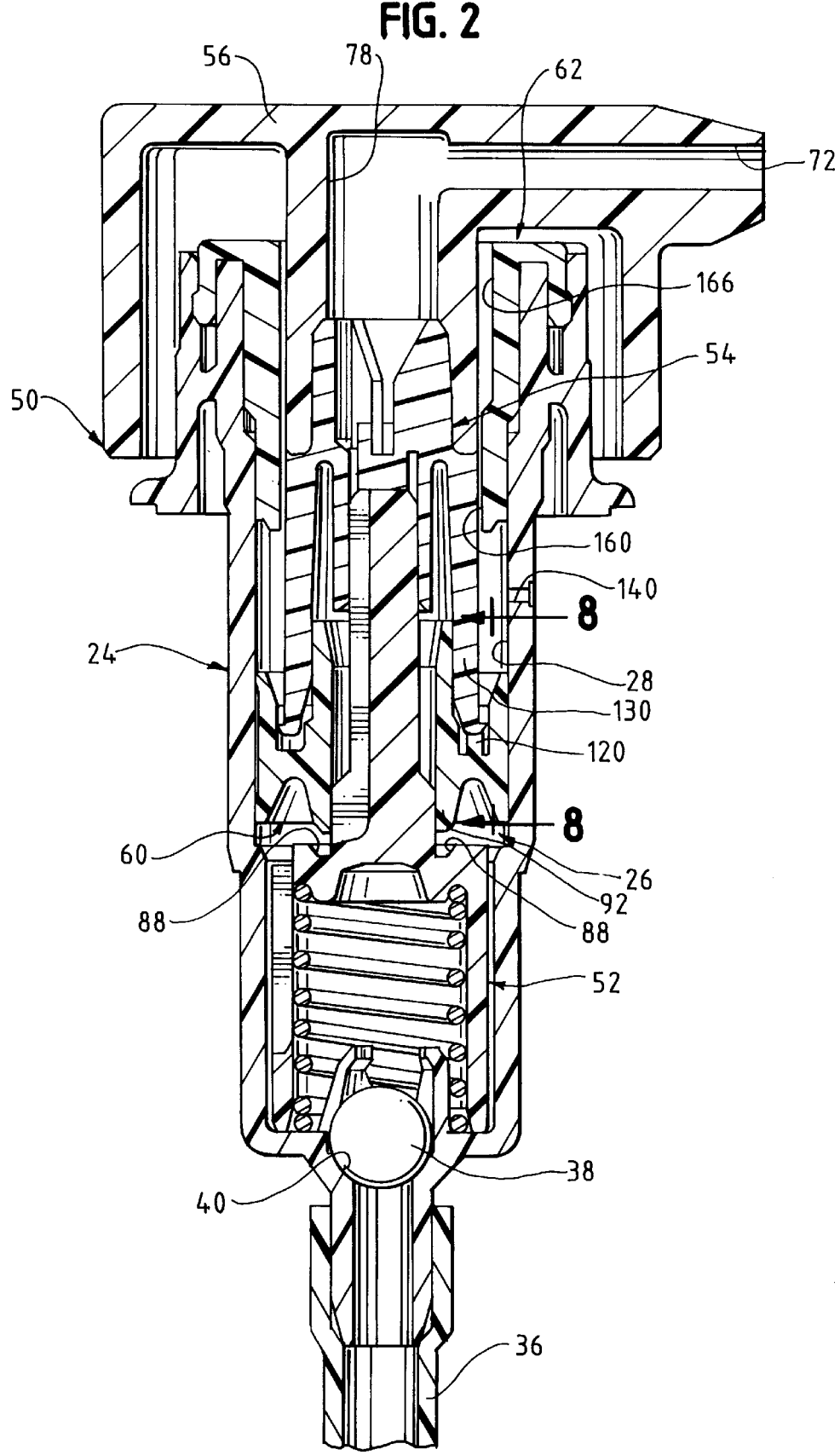
FIG. 2 is a view similar to FIG. 1, but FIG. 2 shows the pump components in a fully lowered, actuated position.
Figure 8:
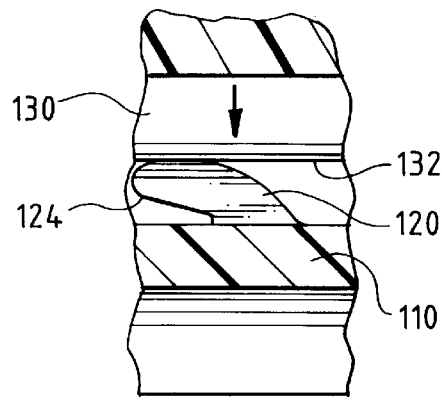
FIG. 8 is a fragmentary, elevational, cross-sectional view taken generally along the plane 8—8 in FIG. 2.

As the plunger 50 moves further downwardly, the bottom end of the lower stem 52 abuts the bottom of the pump chamber 26 as shown in FIG. 2, and downward movement of the plunger is terminated. Sometime prior to the plunger 50 reaching its lowest, fully actuated position as shown in FIG. 2, the pressure within the pump chamber 26 is sufficient to cause the rate of downward movement of the piston 60 to decrease relative to the rate of downward movement of the upper stem 52. The relative movement rates are accommodated by the bending of the piston spring posts 120 as shown in FIG. 8. Owing to the increasing chamber pressure, each post 120 bends toward the piston cross wall 110 to accommodate separation of the piston inner valve member 92 from the plunger lower stem valve seat 88 which moves downwardly faster and farther than the piston 60.

By appropriate design of the posts 120, the posts can have a stiffness which will permit bending of the posts at a predetermined pressure within the pump chamber 26. The piston 60 will thus separate from the lower stem valve seat 88 at the predetermined pressure so as to open the passageways along the lower stem 52 so that the fluid can flow from the chamber 26 through the upper stem 54 and be discharged from the actuator button 56. If the fluid is air, the discharge of some of the air from the pump chamber 26 will decrease the pressure within the pump chamber and substantially reduce the amount of air within the pump chamber as part of the pump priming process.

If the pump chamber 26 had already been previously primed with liquid from the container, then the liquid is discharged as the actuating plunger 50 is forced downwardly relative to the piston 60 so as to open the discharge passage as the piston posts 120 bend downwardly and the piston separates from the lower stem valve seat 88.

Figure 4:
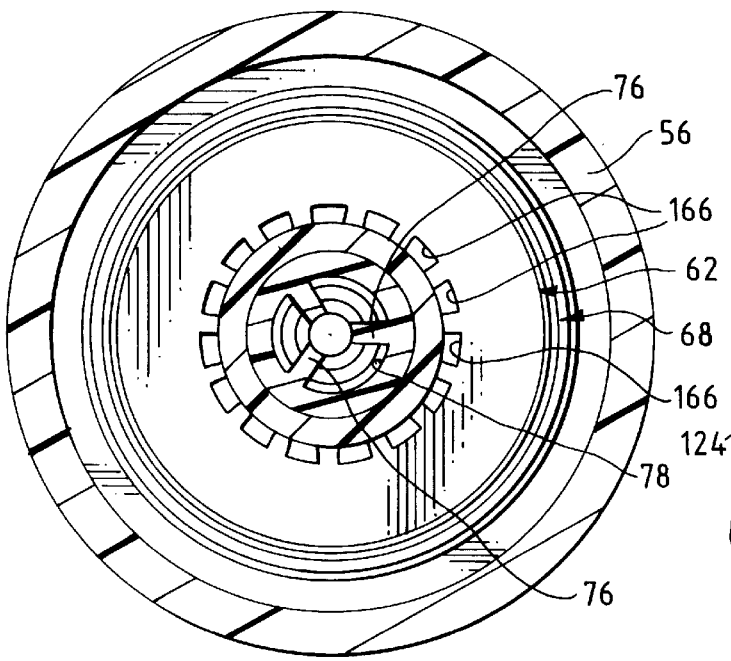
FIG. 4 is a cross-sectional view taken generally along the plane 4—4 in FIG. 1.

The upper stem outer annular wall 130 has a slightly tapered exterior surface which increases in diameter toward the bottom of the upper stem 54. The inside surface of the collar 62 is similarly tapered. When the pump 20 is in the elevated, unactuated, rest position as shown in FIG. 1, the mating tapering surfaces are close together or in contact. The upper part of the inside surface of the collar 62 defines a plurality of spaced-apart, vertical channels 166 as illustrated best in FIG. 4. One of the channels 166 can also be seen on the right-hand side of the pump in FIGS. 1–3. As illustrated in FIG. 2, when the pump plunger 50 is pushed downwardly, the small tapers on the facing surfaces of the upper stem 54 and collar 62 increasingly separate to define a larger flow channel 160 which communicates with the vertical slots 166.

The channel 160 and slots 166 are part of a longer flow path which is opened between the inside of the container and the ambient atmosphere on the exterior of the pump as the piston 60 moves downwardly with the actuating plunger 50. This insures that there will always be ambient atmospheric pressure in the container above the liquid to assist in causing flow of the container liquid up the dip tube 36 into the pump chamber 26 when the downward force is removed from the plunger 50, and the plunger 50 is allowed to return to the unactuated, elevated, rest position (FIG. 1). This longer flow path defines a venting system which includes an orifice 140 (FIG. 2) defined in the wall of the pump body 24. When the piston 60 is below the orifice 140 as shown in FIG. 2, the orifice 140 communicates between the space on top of the liquid in the container and the cylindrical portion 28 of the pump chamber above the piston 60.

Thus, when the piston 60 is below the pump body orifice 140 as shown in FIG. 2, ambient outside air can flow under the actuator button 56, through the collar slots 166, through the space between the tapered upper stem wall 130 and collar 62, into the pump chamber upper cylindrical portion 28 above the piston 60, through the pump body orifice 140, and into the container over the liquid.

When the force on the actuator button 56 is released, the plunger return spring 102 forces the actuating plunger 50 upwardly to the fully elevated, unactuated, rest position (FIG. 1). In this position, the piston upper lip 114 is above the pump body orifice 140, and the piston lower lip 116 is below the pump body orifice 140. The orifice 140 is thus sealed, and liquid from the container cannot leak out of the pump 20 through the orifice 140—even if the container and pump 20 are inverted.

As the pump components return to the elevated, unactuated position illustrated in FIG. 1, the volume of the pump chamber 26 below the piston 60 increases compared to the much smaller volume below the piston 60 when the pump 20 is in the lowered, fully actuated position illustrated in FIG. 2. The increase in volume between the fully actuated and unactuated positions necessarily results in a substantial decrease in pressure within the pump chamber 26. Owing to the atmospheric pressure within the container above the liquid, a pressure differential is created which causes the liquid in the container to flow up the dip tube 36 into the pump chamber 26, and the check valve ball 38 is lifted off of its seat 40 as illustrated in FIG. 3 to accommodate the flow of liquid into the pump chamber 26.

If the pump 20 had not been previously actuated and primed with liquid, then the first return stroke of the actuating plunger 50 to the elevated, rest position may result in little or no liquid flowing into the pump chamber 26. The user may have to actuate the pump 20 a number of times by pushing the actuator button 56 downwardly a number of times in order to fill the pump chamber 26 with liquid. Once the pump chamber 26 is substantially filled with liquid, each subsequent actuation of the pump will result in a discharge of the liquid from the pump.

It can be seen that each piston spring post 120 accommodates lateral bending (out of the vertical axis as shown in FIG. 8). This bending is free from any radial bending outwardly toward the cylindrical wall of the pump body 24. The use of the spring post 120 provides a more precise control of the relative movement between the piston 60 and the lower stem 52 and upper stem 54. This is an improvement over conventional designs wherein the movement of the piston relative to the stems is controlled solely by a friction fit between surfaces of the piston and surfaces of the upper and lower stems. In such conventional designs, it is difficult to provide a constant, or predetermined friction force owing to the manufacturing tolerances encountered in typical thermoplastic molding operations. The use of the spring posts 120 according to the present invention facilitates economical manufacture, high production quality, and consistent operating parameters unit-to-unit with high reliability. In addition, the pump priming process is improved.

It will be appreciated that other design configurations may be employed for each piston return spring post. One or more such posts may be incorporated in alternate designs, and the posts may be alternatively formed or molded as part of the bottom end of the upper stem outer annular wall 130.

According to another aspect of the invention, a post or plurality of posts could be provided in a structure separate from either the piston 60 or the upper stem 54. Such a post structure would be loose, but trapped between, the upper stem 54 and the piston 60.

It will also be appreciated that the other pump components, including the actuator button 56 and pump body 24, may have alternate designs. Further, other types of check valve systems may be used in place of the ball 38. A plunger return spring may have a design other than the helical coil configuration illustrated for the spring 102. The piston 60 may have a configuration different from that illustrated. The configuration of the upper and lower stems 54 and 52, respectively, may also be modified. Of course, such modifications must accommodate the preferred, illustrated design of the piston return spring posts 120 as well as modified or alternate designs of such posts.

It will be readily apparent from the foregoing detailed description of the invention and from the illustrations thereof that numerous variations and modifications may be effected without departing from the true spirit and scope of the novel concepts or principles of this invention.

What is claimed is:

1. A finger-operable pump comprising:
    a pump body defining a chamber and having an inlet opening and outlet opening;
    a non-return valve located at said inlet opening;
    an actuating plunger projecting from said chamber for reciprocatable movement between an elevated, unactuated, rest position and a lowered, fully actuated position, said plunger having upper and lower plunger portions together defining a discharge passage establishing communication between ambient atmosphere and said chamber, said plunger lower portion defining a valve seat at said discharge passage;
    a plunger return spring acting between said pump body and plunger lower portion for biasing said plunger relative to said pump body toward said rest position;
    a piston carried by said plunger in said pump chamber in sliding and sealing engagement with said pump body for accommodating movement relative to said plunger between (a) a closed position sealed against said valve seat to occlude said discharge passage, and (b) an open position spaced from said valve seat; and a piston return spring acting between said piston and plunger upper portion for biasing said piston toward said closed position, said piston return spring including a post which is oriented for being subjected to compressive loading and which is resiliently bendable.

2. The pump in accordance with claim 1 in which said piston return spring is separate from both said piston and said plunger.

3. The pump in accordance with claim 1 in which said piston return spring is molded from a thermoplastic material in the form of a post as a unitary extension of said plunger upper portion.

4. The pump in accordance with claim 1 in which
said plunger includes an actuator button defining a dispensing cavity and a communicating dispensing orifice; and
said discharge passage is defined in part by three parallel passageways which extend from said valve seat at one end to said dispensing cavity at the other end.

5. The pump in accordance with claim 1 in which said plunger upper portion and said plunger lower portion are molded from thermoplastic material as separate pieces which are subsequently attached together to form an integral structure.

6. The pump in accordance with claim 1 in which said post accommodates lateral bending free from radial bending outwardly toward said pump body.

7. A finger-operable pump comprising:
a pump body defining a chamber and having an inlet opening and outlet opening;
a non-return valve located at said inlet opening;
an actuating plunger projecting from said chamber for reciprocatable movement between an elevated, unactuated, rest position and a lowered, fully actuated position, said plunger having upper and lower plunger portions together defining a discharge passage establishing communication between ambient atmosphere and said chamber, said plunger lower portion defining a valve seat at said discharge passage;
a plunger return spring acting between said pump body and plunger lower portion for biasing said plunger relative to said pump body toward said rest position;
a piston carried by said plunger in said pump chamber in sliding and sealing engagement with said pump body for accommodating movement relative to said plunger between (a) a closed position sealed against said valve seat to occlude said discharge passage, and (b) an open position spaced from said valve seat;
said piston including an annular inner valve member for sealingly engaging said valve seat;
said piston including an annular, outer ring slidably and sealingly engaging an inside surface of said pump body; and
a piston return siring acting between said piston and plunger upper portion for biasing said piston toward said closed position, said piston return spring including a post which is resiliently bendable, said piston return spring having been molded from a thermoplastic material in the form of a post as a unitary extension of said piston between said annular outer ring and said annular inner valve member, said post having a laterally offset distal end which is resiliently bendable toward said piston to accommodate separation of said piston inner valve member from said plunger lower portion valve seat when the pressure within said chamber increases sufficiently.

8. The pump in accordance with claim 7 in which said piston return spring includes three of said posts.

9. The pump in accordance with claim 8 in which said plunger upper portion includes a generally cylindrical annular wall defining a downwardly facing, annular, bearing surface for being engaged by said posts.

10. A finger-operable pump comprising:
a pump body defining a chamber and having an inlet opening and outlet opening;
a non-return valve located at said inlet opening;
an actuating plunger projecting from said chamber for reciprocatable movement between an elevated, unactuated, rest position and a lowered, fully actuated position, said plunger having upper and lower plunger portions together defining a discharge passage establishing communication between ambient atmosphere and said chamber, said plunger lower portion defining a valve seat at said discharge passage;
a plunger return spring acting between said pump body and plunger lower portion for biasing said plunger relative to said pump body toward said rest position;
a piston carried by said plunger in said pump chamber in sliding and sealing engagement with said pump body for accommodating movement relative to said plunger between (a) a closed position sealed against said valve seat to occlude said discharge passage, and (b) an open position spaced from said valve seat;
a piston return spring acting between said piston and plunger upper portion for biasing said piston toward said closed position, said piston return spring including a post which is resiliently bendable, said piston return spring having been molded from a thermoplastic material in the form of a post as a unitary extension of said piston, said post having a laterally offset distal end which is resiliently bendable toward said piston to accommodate separation of said piston from said plunger lower portion valve seat.

11. A finger-operable pump suitable for mounting on a container to dispense fluid therefrom, said pump comprising:
a pump body defining a chamber and having an outlet opening and a fluid supply inlet opening for accommodating flow of fluid from said container into said pump chamber;
a non-return valve located at said inlet opening to prevent return flow of fluid out of said pump chamber through said inlet opening;
an actuating plunger disposed through said chamber outlet opening in said chamber for reciprocatable movement between an elevated, unactuated, rest position and a lowered, fully actuated position, said plunger having upper and lower stem portions together defining a discharge passage establishing communication between ambient atmosphere and said chamber, said lower stem portion defining a valve seat at said discharge passage;
a plunger return spring acting between said pump body and lower stem portion for biasing said plunger relative to said pump body toward said rest position;
a piston slidably disposed in said pump chamber and sealingly engaged with said pump body for accommodating movement (1) initially together with said plunger as said plunger moves toward said fully actuated position, and (2) subsequently relative to and along said plunger between (a) a closed position sealed against said valve seat to occlude said discharge passage, and (b) an open position spaced from said valve seat; and a piston return spring acting between said piston and upper stem portion for biasing said piston toward said closed position, said piston return spring including a post which is oriented for being subjected to compressive loading and which is resiliently bendable.

* * * * *